United States Patent [19]

Roberts

[11] Patent Number: 5,275,531
[45] Date of Patent: Jan. 4, 1994

[54] AREA RULED FAN BLADE ENDS FOR TURBOFAN JET ENGINE

[75] Inventor: William B. Roberts, Fremont, Calif.
[73] Assignee: Teleflex, Incorporated, Limerick, Pa.
[21] Appl. No.: 55,203
[22] Filed: Apr. 30, 1993
[51] Int. Cl.$^5$ .............................................. F01D 25/24
[52] U.S. Cl. .................... 415/173.1; 415/914; 416/196 R
[58] Field of Search ................. 415/173.1, 173.4, 914; 416/193

[56] References Cited

U.S. PATENT DOCUMENTS

| | | |
|---|---|---|
| Re. 32,737 | 8/1988 | Ortolano . |
| 2,772,854 | 12/1956 | Anxionnaz . |
| 2,874,922 | 2/1959 | Whitcomb ........................ 244/130 |
| 3,806,067 | 4/1974 | Kutney ............................ 60/39.31 |
| 3,837,761 | 9/1974 | Brown . |
| 3,934,410 | 1/1976 | Williams ........................... 415/914 |
| 4,012,165 | 3/1977 | Kraig ................................ 415/145 |
| 4,086,022 | 4/1978 | Freeman et al. . |
| 4,171,183 | 10/1979 | Cornell et al. .................... 416/94 |
| 4,566,700 | 1/1986 | Shiembob ....................... 415/173.4 |
| 4,677,828 | 7/1987 | Matthews ......................... 415/914 |
| 5,056,738 | 10/1991 | Mercer et al. . |

Primary Examiner—Edward K. Look
Assistant Examiner—Michael S. Lee
Attorney, Agent, or Firm—Reising, Ethington, Barnard, Perry & Milton

[57] ABSTRACT

An axial flow transonic turbofan jet engine includes a hub (26) from which radiate a plurality of rotor blades (50). A casing (12) surrounds and shrouds the rotor blades (50). Part-span dampers (56) are located between adjacent rotor blades (50) in an annular pattern to stiffen the elongated rotor blades (50) during operation. The distal tips (54) of the rotor blades (50) are convexed and spin within a rub strip (62) embedded within the casing (12). The rub strip (62) includes an annularly troughed contour (60) to closely conform with the convex tips (54) of the rotor blades (50). The hub (26) may also include an annularly troughed contour (60) formed along the roots (52) of the rotor blades (50). The annularly troughed contours (60) in the hub (26) and in the casing (12) are radially aligned with the part-span dampers (56) to reduce drag between the casing (12) and the hub (26) caused by the part-span dampers (56) at transonic speeds.

18 Claims, 2 Drawing Sheets

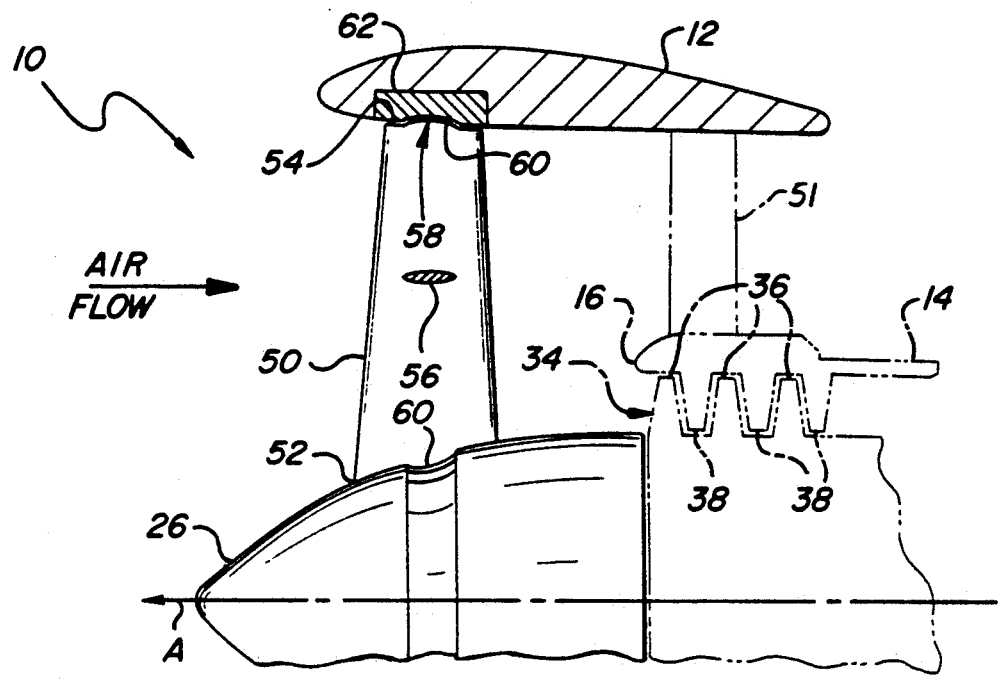
FIG-2
FIG-3
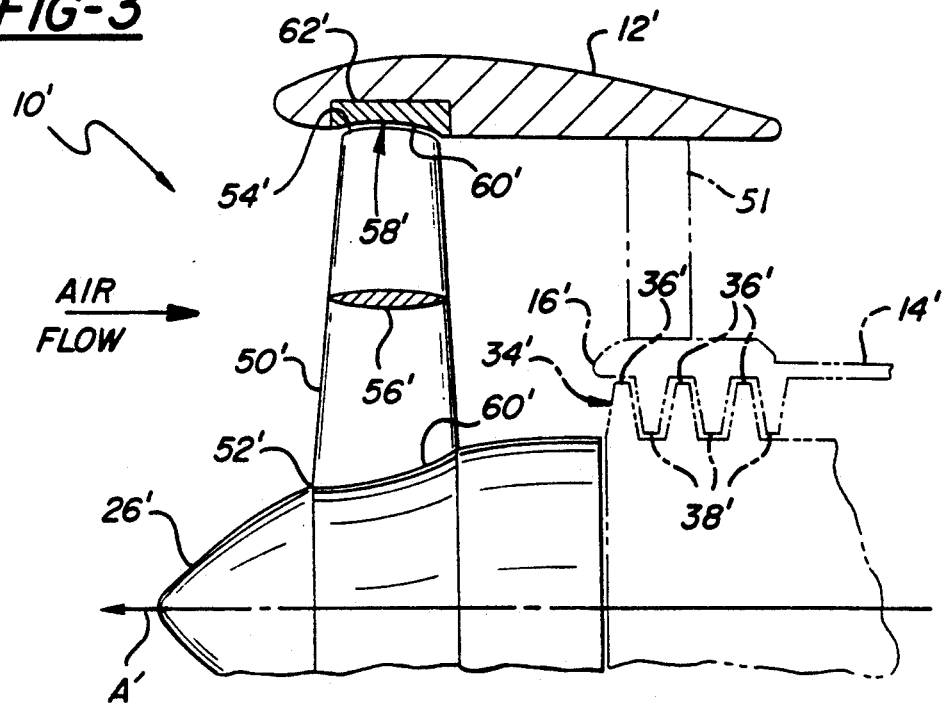

AREA RULED FAN BLADE ENDS FOR TURBOFAN JET ENGINE

TECHNICAL FIELD

The subject invention relates to axial flow transonic shrouded rotors, and more particularly to rotor blades for such shrouded rotors having part-span dampers.

BACKGROUND ART

In shrouded rotor applications, it is frequently the case that spinning rotor blades are operated at exceptionally high rotational velocity. From an aerodynamic standpoint, high rotational velocities are not a particular concern when dealing with small diameter rotors. However, with larger diameter rotors, such as typically found in turbofan jet engines and steam turbines, large angular velocities can result in linear velocities at radially extended locations, e.g., at the rotor blade tips, which approach and even exceed the speed of sound in the particular fluid medium. These high local velocities at the tips of the rotor blades which approach or exceed the speed of sound are associated with an increase in drag due to a reduction in the total pressure through shock waves and due to thickening and even separation of the boundary layer due to the local but severe adverse pressure gradients caused by the shock waves.

In many shrouded rotor applications, e.g., the fan section of an axial flow turbofan jet engine, the rotor blades are stiffened by part-span dampers which circumferentially interconnect adjacent rotor blades thereby encircling the hub from which the rotor blades extend. Since many such shrouded rotor applications operate at exceptionally high rotational velocities, these large diameter rotor blades have a tendency to untwist as a result of the air pressures generated. In these instances, part-span dampers are particularly useful in rigidifying the rotor blades and dampening vibration. Typically, the part-span dampers are located between one-half and two-thirds distance from the hub.

When the shrouded rotor is operated at transonic speeds, i.e., the linear velocity of the rotor blades relative to the freestream approaches and exceeds Mach 1.0, the physical presence of the part-span dampers in the flow path between the hub and the casing surrounding the rotor blades increases shock wave drag. Such drag has the net effect of reducing fuel efficiency in the case of turbofan jet engines. In such applications, approximately 50% of the available energy produced in the combustion process is required to operate the compressor section and large bypass fan section. Therefore, it will be appreciated that a reduction in shock wave drag will have a considerable effect on engine efficiencies.

It has been indicated that to minimize drag losses caused by the part-span dampers, several things should be taken into consideration. First, the leading and trailing edges of the part-span dampers should be as sharp as possible. Second, the part-span dampers should be located as near to the hub as possible to minimize shock losses. Third, work input should be minimized at the part-span damper location. Fourth, the part-span damper should be as thin as possible to minimize the area influenced. However, even after all of these design considerations have been implemented, there remains a part-span damper of some size in some location along the rotor blades that causes additional profile and shock losses simply due to its physical presence. Accordingly, there remains incentive for further optimization of the rotor/part-span damper combination to minimize losses at transonic speeds.

A fruitful area of past research in transonic aerodynamics has included the well-known Area Rule. Heretofore, the Area Rule has only been applied in external flow situations where a drag reduction for wing/body combinations has been realized, as originally proposed by Richard T. Whitcomb in "A Study of the Zero-Lift Drag-Rise Characteristics of Wing-Body Combinations Near the Speed of Sound", NACA TR 1273, 1952. The theories of transonic and supersonic flow with small disturbances were extended in a very practical way by Whitcomb in his development of the Area Rule. The Area Rule aims at arranging the airplane components so that the total aircraft cross-sectional area, in planes perpendicular (normal) to the line of flight, has a smooth and prescribed variation. The designing of a fuselage with variable diameter for transonic drag reasons is sometimes called "coke-bottling".

The Area Rule, more particularly, states that all aircraft having the same longitudinal distribution of cross-sectional area in planes normal to the flight direction, including the wings, fuselage, nacelles, tail surfaces, or any other components, will have the same wave drag at zero lift. Thus, a complex airplane will have the same zero-lift wave drag as a body of revolution whose cross-sectional area is the same at corresponding longitudinal locations. Although Whitcomb's Area Rule has been successfully applied in external flow conditions for several decades, the prior art has never considered applying the Area Rule to the flow through rotating blades in an axial flow shrouded rotor section.

SUMMARY OF THE INVENTION AND ADVANTAGES

The subject invention contemplates an axial flow transonic shrouded rotor assembly. The assembly comprises an annular casing for axially conducting fluid therethrough and defining a central longitudinal axis. A hub is rotatably supported about the axis in the casing. A plurality of rotor blades are spaced about and radiate from the hub. Each rotor blade includes a part-span damper circumferentially interconnecting the next adjacent rotor blade. The assembly is characterized by area ruling means formed in either the hub or the casing for reducing drag between the casing and the hub caused by the part-span dampers at transonic speeds.

The subject invention also contemplates a method for reducing drag at transonic speeds in an axial flow shrouded rotor assembly. The method comprises the steps of rotatably suspending a hub about a central longitudinal axis, connecting a plurality of axial flow rotor blades to the hub, supporting an annular casing closely about the tips of the rotor blades, interconnecting adjacent rotor blades with part-span dampers having a prescribed cross-sectional area in radial planes containing the axis, and axially directing fluid flow between a hub and casing while rotating the rotor blades. The method is characterized by enlarging the cross-sectional area of the hub and casing in radial planes containing the axis by an amount generally equal to the cross-sectional area of the part-span dampers to reduce drag between casing and hub caused by the part-span dampers at transonic speeds.

The most practical manner in which to apply Whitcomb's Area Rule to channel type flow through a shrouded rotor is to contour the hub and/or the casing at the rotor blade tips to allow for the blockage of the part-span dampers, thereby arranging the cross-sectional area between the hub and casing to have a smooth and prescribed variation. Such contouring of the hub and/or casing can be accomplished with minimal structural effect on the rotor blading itself and upon the shape of the part-span dampers. Furthermore, such contouring of the hub and/or casing can be accomplished in a repair/retrofit operation, and at a relatively economical expense.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a simplified fragmentary cross-sectional view of a turbofan jet engine as in FIG. 1; and FIG. 3 is a view as in FIG. 2 showing the part-span damper having an increased chord dimension.

DETAILED DESCRIPTION OF THE PREFERRED EMBODIMENT

Figure 1:
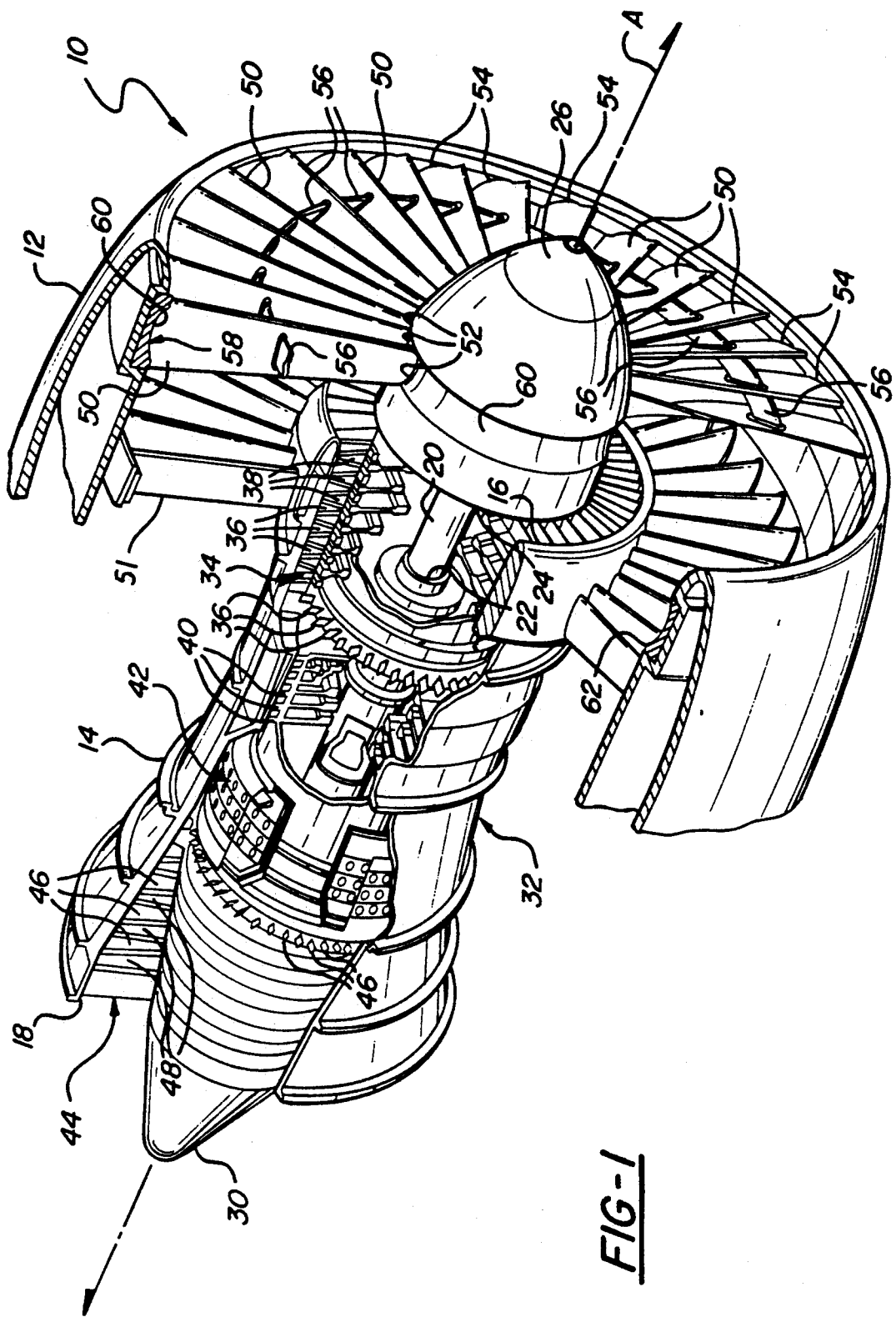
FIG. 1 is a partially sectioned perspective view of an axial flow turbofan jet engine incorporating the area ruling means of the subject invention.

Referring to the FIGS., wherein like numerals indicate like or corresponding parts throughout the several views, an axial flow transonic shrouded rotor assembly is generally shown at 10. Although the following description and accompanying drawings describe the invention with reference to incorporation in a turbofan jet engine, it will be readily appreciated by those skilled in the art that the unique and advantageous features of the invention are equally applicable within other shrouded rotor configurations, both driving the fluid medium and driven by the fluid medium, such as steam turbines, ground application gas turbines, high speed ducted fans, etc.

The assembly 10 includes an annular casing 12 for axially conducting fluid therethrough and defining a central longitudinal axis A. The casing 12 is supported concentrically about a tubular housing 14 forming the jet engine core. The housing 14 extends along the axis A and has an inlet end 16 disposed within the casing 12 and an outlet end 18. A shaft 20 is rotatably supported within the housing 14 upon spaced bearings 22. Thus, the shaft 20 rotates about the axis A within the housing 14. The shaft 20 includes a first end 24 to which is fixedly connected a spinner, or hub 26. In this manner, the hub 26 is rotatably supported about the axis A centrally within the casing 12. The shaft 20 also includes a second end from which extends a tail cone 30 protruding from the outlet end 18 of the housing 14.

In a typical application of the assembly 10 adapted for use in an aircraft jet engine, a propulsion means, generally indicated at 32, is operatively disposed between the shaft 20 and the housing 14 for steadily ejecting a high speed mass of fluid from the outlet end 18 of the housing 14 while forcibly rotating the shaft 20. The jet propulsion means 32 includes compressor means, generally indicated at 34, disposed adjacent the first end 24 of the shaft 20 for compressing fluid entering the inlet end 16 of the housing 14. As mentioned above, the assembly 10 preferrably comprises a turbofan jet engine. Therefore, the fluid entering the inlet end 16 of the housing 14 is merely a fraction, e.g., one-fifth, of the fluid ejected from the assembly 10. The compressor means 34 includes a series of intermediate pressure compressor blades 36 radiating from the shaft 20. The intermediate pressure compressor blades 36 are arranged in axially spaced rows with interposed stator blades 38 arranged to build the incoming fluid pressure in stages. Downstream of the intermediate pressure compressor blades 36 is located a plurality of high pressure compressor blades 40 radiating from the shaft 20. Similar to the intermediate pressure compressor blade 36 arrangement, the high pressure compressor blades 40 are arranged in axially spaced rows with interposed stator blades 38.

The jet propulsion means 32 further includes combustor means, generally indicated at 42, located immediately downstream of the high pressure compressor blades 40. The combustor means 42 continuously combusts the compressed air received from the compressor means 34.

The jet propulsion means 32 also includes turbine means, generally indicated at 44, located immediately downstream of the combustor means 42 and adjacent the outlet end 18 of the housing 14, for rotatably driving the compressor means 34. The turbine means 44 is comprised of a plurality of turbine blades 46 radiating from the shaft 20, adjacent its second end. The turbine blades 46, like the compressor blades 36, 40, are arranged in axially spaced rows and separated by flow straightening stators 48. The hot expanding combustion gases from the combustor means 42 turn the turbine blades 46, and thus the shaft 20. For modern high-bypass turbofan jet engines with large fan sections, as shown in FIG. 1, approximately one half of the available energy is required to rotate the shaft 20. The remaining available energy in the exhaust gas is converted to kinetic energy which, according to Newton's Third Law, applies a forward thrust to the assembly 10 as it exits the outlet end 18 of the housing 14 at high speed.

In the preferred embodiment of the invention illustrated in the accompanying FIGS., the assembly 10 comprises a turbofan jet engine which includes a plurality of rotor blades 50 comprising the fan section. The rotor blades 50 are spaced about and radiate from the hub 26. In typical fashion, the rotor blades 50 have a twisted airfoil shape. The flow of air exiting the rotor blades 50 is straightened by a plurality of vane guides 51 rigidly extending between the housing 14 and the casing 12. The rotor blades 50 are individually connected to the hub 26, or more particularly to the shaft 20, using mechanically interlocking joints well known to those skilled in the art. The rotor blades 50 extend from a root portion 52 at the hub 26 to a distal tip 54 maintained in close proximal relation to the inner periphery of the casing 12.

For large commercial (high-bypass) aircraft applications, the rotor blades 50 may have a root 52 to distal tip 54 measurement of three feet or more. Such high-bypass engines may direct as much as four-fifths of the total air intake through only the fan section. In other words, approximately one-fifth of the intake air enters the inlet end 16 of the housing 14 to operate the propulsion means 32, whereas four-fifths of the intake air is acted upon solely by the rotor blades 50. Therefore, according to Newton's Third Law, the air acted upon by the rotor blades 50 applies a significant amount of forward thrust to the assembly 10.

Because of these extended lengths, the rotor blades 50 would exhibit undesirable deflection and vibration during operation absent additional structural stiffening. For this reason, each rotor blade 50 includes a part-span damper 56 circumferentially interconnecting the next adjacent rotor blade 50 to form an annular structural stiffening member between the root 52 and distal tip 54 of the rotor blades 50. Conventional wisdom locates the part-span dampers 56 somewhere between one half and two thirds of the distance from the root portion 52, although any position along the rotor blades 50 will provide structural stiffening (including positions at the extreme distal tips 54).

Because of the large fan section diameter in modern high-bypass ratio engines, the distal sections of the rotor blades 50 may achieve transonic speeds (Mach 0.65 to Mach 1.8) during normal operation. Such localized body movement in the transonic range creates an increase in drag due to a reduction in total pressure through shock waves and due to thickening and even separation of the boundary layer as a result of severe adverse pressure gradients caused by the shock waves. Thus, the physical presence of the part-span dampers 56 naturally gives rise to additional profile and shock losses at these high relative speeds.

To further optimize the shape of the assembly 10 and minimize these losses, the subject invention includes area ruling means, generally indicated at 58, formed either in the casing 12 or the hub 26, or both, for reducing drag between the casing 12 and the hub 26 caused by the part-span dampers 56 at transonic speeds. As perhaps most clearly shown in the highly simplified FIG. 2, the area ruling means 58 comprises an annularly troughed contour 60 formed either internally in the casing 12 or externally on the hub 26, or both. To achieve the desired effects, the troughed contour 60 is radially aligned with the part-span dampers 56. Thus, the troughed contour 60 will have the same axial location along the axis A as does the rotor blades 50.

FIG. 3 illustrates an alternative configuration of the part-span dampers 56' having an increased chord measure substantially fully spanning the rotor blades 50'. It will be noted that the troughed contour 60' increases in cross-sectional area proportionately with the increased cross-sectional area of the part-span dampers 56'. Thus, if it becomes necessary to increase the size of the part-span dampers 56' for structural reasons, the troughed contour 60 will increase in size accordingly, thereby minimizing the additional shock losses otherwise attributable to enlarged part-span dampers 56'.

As shown in FIGS. 2 and 3, the troughed contour 60, 60', whether formed in the casing 12, 12' or the hub 26, 26' or both, vacates an area in any radial plane passing through (containing) the axis A, A' which is approximately equal to the area displaced by the part-span dampers 56, 56' in the same radial plane. In other words, in the plane of the sheet of paper upon which FIGS. 2 and 3 are represented, the cross-sectional area relieved by the troughed contour 60, 60' approximately equals the cross-sectional area of the part-span dampers 56, 56', thereby fully implementing Whitcomb's Area Rule. It will be seen by comparison between FIGS. 2 and 3, that the smaller the cross-sectional area of the part-span damper 56, 56' the smaller the area relieved or vacated by the troughed contour 60, 60'. And, conversely, the larger the cross-sectional area of the part-span dampers 56. 56', the larger the cross-sectional area vacated by the troughed contour 60, 60'.

Referring again to all of the FIGS., it is illustrated that the distal tips 54, 54' of each of the rotor blades 50, 50' are formed with a convex curvature which conform to the troughed contour 60, 60' the casing 12, 12'. Typically, the casing 12, 12' includes a rub strip 62, 62' in which is formed the troughed contour 60, 60'. Thus, the area ruling means 58, 58' of the subject invention may be retrofit upon an existing jet engine assembly 10, 10' by substituting a rub strip 62, 62' having a properly formed troughed contour 60, 60' in place of the stock rub strip. The distal tips 54, 54' of the rotor blades 50, 50'are then individually removed and reshaped to closely conform to the troughed contour 60, 60' in the rub strip 62, 62' in a manner similar to that shown in the FIGS.

In practice, the invention is employed for the purpose of reducing drag at transonic speeds and an axial flow shrouded rotor assembly 10. The method comprises the steps of rotatably suspending the hub 26 about the central longitudinal axis A, connecting a plurality of axial flow rotor blades 50 to the hub 26, supporting an annular casing 12 closely about the tips of the rotor blades 50, interconnecting adjacent rotor blades 50 with part-span dampers 56 having a prescribed cross-sectional area in radial planes containing the axis A, and axially directing fluid flow between the hub 26 and the casing 12 while rotating the rotor blades 50. The improved method is characterized by enlarging the cross-sectional area between the hub 26 and the casing 12 in radial planes containing the axis A by an amount generally equal to the cross-sectional area of the part-span dampers 56 to reduce drag between the casing 12 and the hub 26 caused by the part-span dampers 56 at transonic speeds. In other words, the area between the hub and the casing in any longitudinal plane radiating from the axis A is opened up, or increased, by the amount of area blocked by the part-span dampers 56, thereby implementing Whitcomb's Area Rule within the field of internal flow through an axial flow shrouded rotor assembly 10.

The enlarging step comprises forming a troughed contour 60 in the casing 12. The troughed contour 60 is aligned in both the axial and radial directions with the part-span dampers 56, as required by the Area Rule. The method further includes the step of contouring the distal tips 54 of the rotor blades 50 to closely conform with the shape of the troughed contour 60 formed in the casing 12. The step of forming the troughed contour 60 further includes positioning the troughed contour 60 in the rub strip 62 of the casing 12. As described above, the step of enlarging the cross-sectional area between the hub 26 and the casing 12 may also include forming a troughed contour 60 in the hub 26 which is aligned in the axial and radial directions with the part-span dampers 56.

Although the foregoing has described the area ruling means 58 as being incorporated within the fan section of a turbofan gas turbine aircraft engine, it will be readily appreciated by those skilled in the art that other applications of the invention are possible with equally successful results. For example, it is frequently the case that one or more rows of the compressor blades 36, 40 are provided with part-span dampers, for which the area ruling means 58 described above may be readily incorporated. Likewise, one or more rows of the turbine blades 46 may be formed with part-span dampers, for which the area ruling means of this invention may be applicable. Likewise, steam turbines or ducted fans having part-span dampers may achieve localized transonic speeds during operation and therefore would benefit by incorporation of the area ruling means 58 of the invention as described above.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An axial flow transonic shrouded rotor assembly (10) comprising: an annular casing (12) for axially conducting fluid therethrough and defining a central longitudinal axis (A); a hub (26) rotatably supported about said axis (A) within said casing (12); a plurality of rotor blades (50) spaced about and radiating from said hub (26), each of said rotor blades (50) including a part-span damper (56) circumferentially interconnecting the next adjacent said rotor blade (50); and characterized by area ruling means (58) formed in one of said hub (26) and said casing (12) for reducing drag between said casing (12) and said hub (26) caused by said part-span dampers (56) at transonic speed.

2. An assembly (10) as set forth in claim 1 further characterized by said area ruling means (58) comprising an annularly troughed contour (60).

3. An assembly (10) as set forth in claim 2 further characterized by said troughed contour (60) being radially aligned with said part-span dampers (56).

4. An assembly (10) as set forth in claim 3 further characterized by said troughed contour (60) vacating an area in any radial plane containing said axis (A) which is approximately equal to the area displaced by said part-span dampers (56) in the same radial plane.

5. An assembly (10) as set forth in claim 3 wherein each of said rotor blades (50) extend outwardly from said hub (26) to a distal tip (54) and said troughed contour (60) is formed in said casing (12), further characterized by each of said distal tips (54) having a convex curvature conforming to said troughed contour (60).

6. An assembly (10) as set forth in claim 5 further characterized by said casing (12) including a rub strip (62) containing said troughed contour (60).

7. An assembly (10) as set forth in claim 5 further characterized by a tubular housing (14) extending along said axis (A) and having an inlet end (16) disposed within said casing (12) and an outlet end (18).

8. An assembly (10) as set forth in claim 7 further characterized by a shaft (20) supported within said housing (14) for rotation about said axis (A) and having a first end (24) fixedly connected to said hub (26).

9. An assembly (10) as set forth in claim 8 further characterized by jet propulsion means (32) operatively disposed between said shaft (20) and said housing (14) for steadily ejecting a high speed mass of fluid from said outlet end (18) of said housing (14) while forcibly rotating said shaft (20).

10. An assembly (10) as set forth in claim 9 further characterized by said jet propulsion means (32) including compressor means (34) disposed adjacent said first end (24) of said shaft (20) for compressing fluid entering said inlet end (16) of said housing (14).

11. An assembly (10) as set forth in claim 10 further characterized by said jet propulsion means (32) including combustor means (42) for combusting compressed air received from said compressor means (34).

12. An assembly (10) as set forth in claim 11 further characterized by said jet propulsion means (32) including turbine means (44) downstream of said combustor means (42) for rotatably driving said compressor means (34).

13. An axial flow transonic turbine assembly comprising: a tubular housing (14) formed about a central longitudinal axis (A): a shaft (20) rotatably supported within said housing (14) along said axis (A); an annular casing (12) supported about said housing (14); a hub (26) fixed to the end of said shaft (20) and disposed centrally within said casing (12); a plurality of rotor blades (50) spaced about and radiating from said hub (26), each of said rotor blades (50) including a part-span damper (56) circumferentially interconnecting the next adjacent said rotor blade (50); and characterized by an annularly troughed contour (60) formed in one of said hub (26) and said casing (12) and radially aligned with said rotor blades (50).

14. A method for reducing drag at transonic speeds in an axial flow shrouded rotor assembly, comprising: rotatably suspending a hub about a central longitudinal axis; connecting a plurality of axial flow rotor blades to the hub; supporting an annular casing closely about the tips of the rotor blades; interconnecting adjacent rotor blades with part-span dampers having a prescribed cross-sectional area in radial planes containing the axis; axially directing fluid flow between the hub and casing while rotating the rotor blades; and characterized by enlarging the cross-sectional area between the hub and casing in radial planes containing the axis by an amount generally equal to the cross-sectional area of the part-span dampers to reduce drag between the casing and the hub caused by the part-span dampers at transonic speeds.

15. A method as set forth in claim 14 wherein said enlarging step comprises forming a troughed contour in the casing aligned in the axial and radial directions with the part-span dampers.

16. A method as set forth in claim 15 further characterized by contouring the distal tips of the rotor blades to closely conform with the shape of the troughed contour.

17. A method as set forth in claim 16 further characterized by positioning the troughed contour in a rub strip of the casing.

18. A method as set forth in claim 14 wherein said enlarging step comprises forming a troughed contour in the hub aligned in the axial and radial directions with the part-span dampers.

* * * * *